United States Patent [19]

Newton et al.

[11] Patent Number: 5,207,488

[45] Date of Patent: May 4, 1993

[54] TRACTION CONTROL MODULATOR

[75] Inventors: Jerry L. Newton, Richmond, Ind.; Donald L. Parker, Middletown, Ohio; Donald M. Flory, Arcanum, Ohio; Timothy A. Haerr, Enon, Ohio

[73] Assignee: General Motors Corporation, Detroit, Mich.

[21] Appl. No.: 864,261

[22] Filed: Apr. 6, 1992

[51] Int. Cl.⁵ .............................................. B60T 8/58
[52] U.S. Cl. ................................ 303/115.2; 303/113.2
[58] Field of Search ................ 303/115 EC, 110, 93, 303/113 TR, 113 TB, 115 R, 113.2, 115.2, 113.3, 115.1; 188/162, 181 A, 181 R

[56] References Cited

U.S. PATENT DOCUMENTS

| | | | |
|---|---|---|---|
| 4,571,010 | 2/1986 | Dittner et al. | 303/110 |
| 4,938,543 | 7/1990 | Parker et al. | 303/100 |
| 5,042,885 | 8/1991 | Villec | 303/115 EC |
| 5,163,744 | 11/1992 | Tierney et al. | 303/115.2 |

Primary Examiner—Douglas C. Butler
Attorney, Agent, or Firm—Ernest E. Helms

[57] ABSTRACT

A vehicle braking actuated traction control system is provided which includes a bored frame fluidly connected with a master cylinder and a wheel brake. A spring biased plunger with a sealing head slidably mounted within the bore isolates the bore from the master cylinder by axial movement of the plunger in a first direction. A piston operatively associated with the plunger is sealably slidably mounted within the bore for creating a variable control volume in the bore in fluid communication with the wheel brake. The piston is connected with the plunger via a spring which biases the plunger away from the piston. A nut is fixably connected with the piston and a drive screw threadably engaged with the piston is reversibly powered by an electric motor which is responsive to the signals given by a controller which is cognizant of a vehicle wheel condition. Upon the appropriate signal the drive screw will power the piston to a position to cause the plunger to isolate the wheel brake from the master cylinder and thereafter modulate the pressure within the wheel brake as commanded by the controller during a traction control cycle.

5 Claims, 2 Drawing Sheets

TRACTION CONTROL MODULATOR

FIELD OF THE INVENTION

The field of the present invention is that of traction control systems (TC) for a vehicle.

DISCLOSURE STATEMENT

Traction control typically incorporates a system which prevents spinning of a powered vehicle wheel on a drive axle thereby maximizing the traction which can be exerted by opposite wheel on the drive axle. Traction control systems often use some type of engine modulation along with actuation of a vehicle braking system. The present invention covers that aspect of a traction control system which is concerned with the automated actuation of the vehicle brakes.

It is desirable in a braking system actuated traction control system that the traction control actuator be as simple as possible and that the actuator provide a quick response while at the same time possess excellent properties of bleedability.

In a prior traction control system the actuator frame has a longitudinal bore. At the bottom of the bore and biased by a first spring to a downward position is a piston. An inlet which connects the actuator frame with the master cylinder is generally at the top of the bore. And the outlet from the bore to a wheel brake is along the side of the actuator bore closely adjacent to the top thereof. The piston carries a needle biased by a second spring which, when moved by the piston upward closes off the inlet which connects the traction control actuator frame with the master cylinder. Thereafter pressurized fluid will be modulated by further upward movement of the piston by a solenoid actuator or downward movement of the piston caused by the force of the first spring biasing the piston. To allow release of the braking system, the solenoid is deactivated allowing the piston to fall under the pressure exerted by the wheel brake to a point where the needle is removed from the inlet and normal braking is thereafter restored.

The aforementioned traction control system provides several disadvantages. The first disadvantage is that there is metal to metal contact used to achieve the sealing between the needle valve and the inlet. Metal to metal is not preferable for sealing purposes because it requires very exact machining or the utilization of very high pressures to achieve the sealing.

More importantly, the previous traction control system requires the utilization of two springs within the modulator frame bore thereby adding to complexity of the system. Furthermore, the first spring which biases the piston to the retracted position is usually stiff and therefore works against solenoid actuation to move the piston upward. The stiffness of the first spring therefore requires either a traction control actuator with a greater electrical power input than desired or reduce reaction time on the first traction control pressure actuation cycle. Furthermore, the prior traction control system relied upon the fluid within the wheel brake to aid the first spring to make the piston retract therefore requiring a greater time on a return cycle (pressure decreasing).

SUMMARY OF THE INVENTION

To provide a traction control system which overcomes the above-noted difficulties, the present invention is brought forth. The present invention provides a traction control system which utilizes a piston with an attached non-rotative nut. The piston can be retracted by a power screw threadably engages with the nut to improve responsive in the release cycle of the traction control system. Additionally, the traction control system of the present invention requires the utilization of only one spring since the piston return spring has been eliminated. The one spring design provides further advantages in that the spring has a relatively wide wrap diameter and a very low spring rate which therefor minimizes any adverse affect upon the actuation cycle times. A preferred embodiment of the present invention has a plunger with an elastomeric sealing head and a rigid member which limits the compression of the elastomeric portion of the sealing head. The above arrangement allows the elastomeric to metal sealing contact without excessive wear or damage to the elastomeric portion even when utilized in the high pressure environments (up to 2,000 psi) of a traction control system.

DETAILED DESCRIPTION OF THE DRAWINGS

Figure 1:
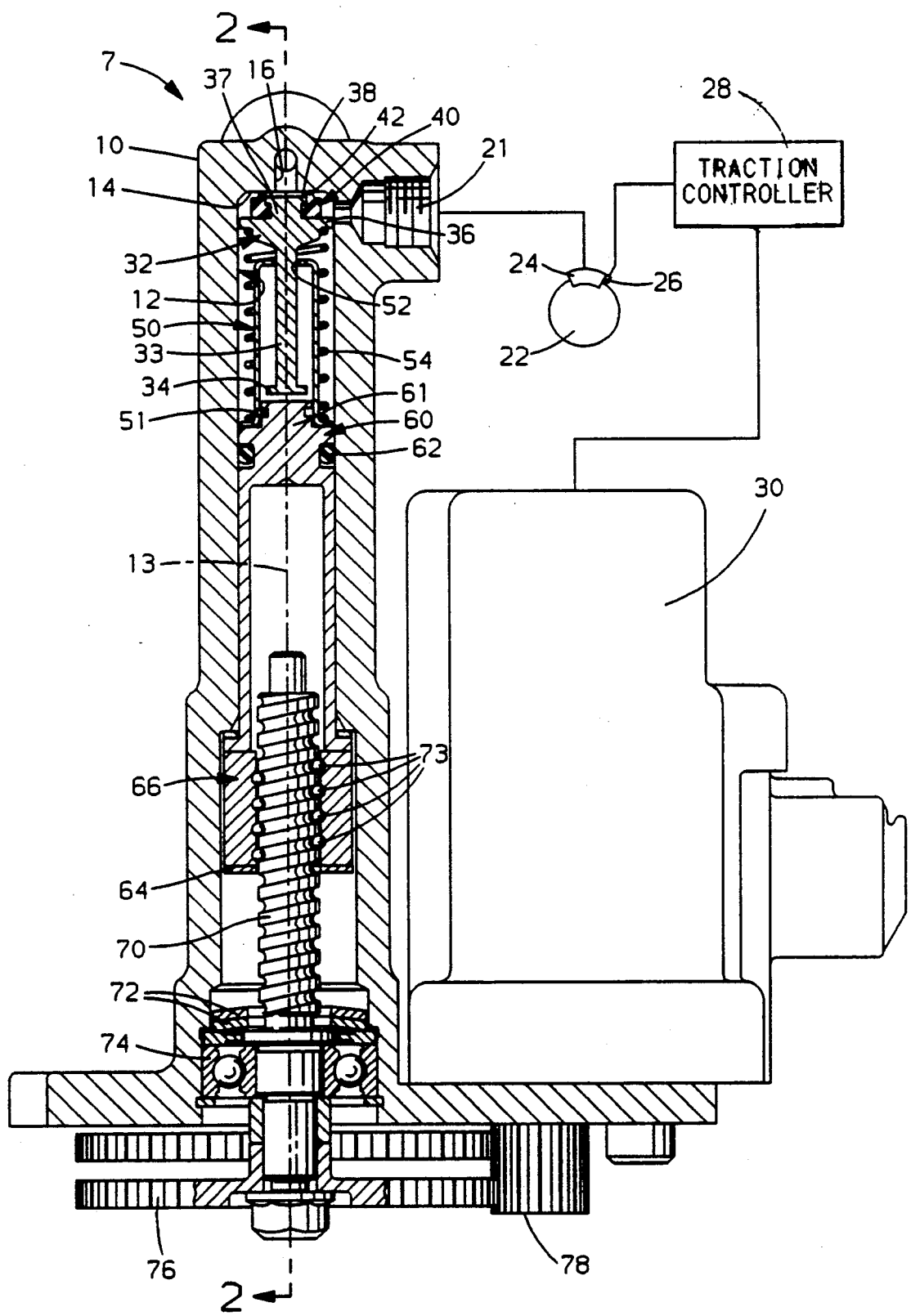
FIG. 1 is a sectional view of a traction control system according to a preferred embodiment of the present invention.
Figure 2:
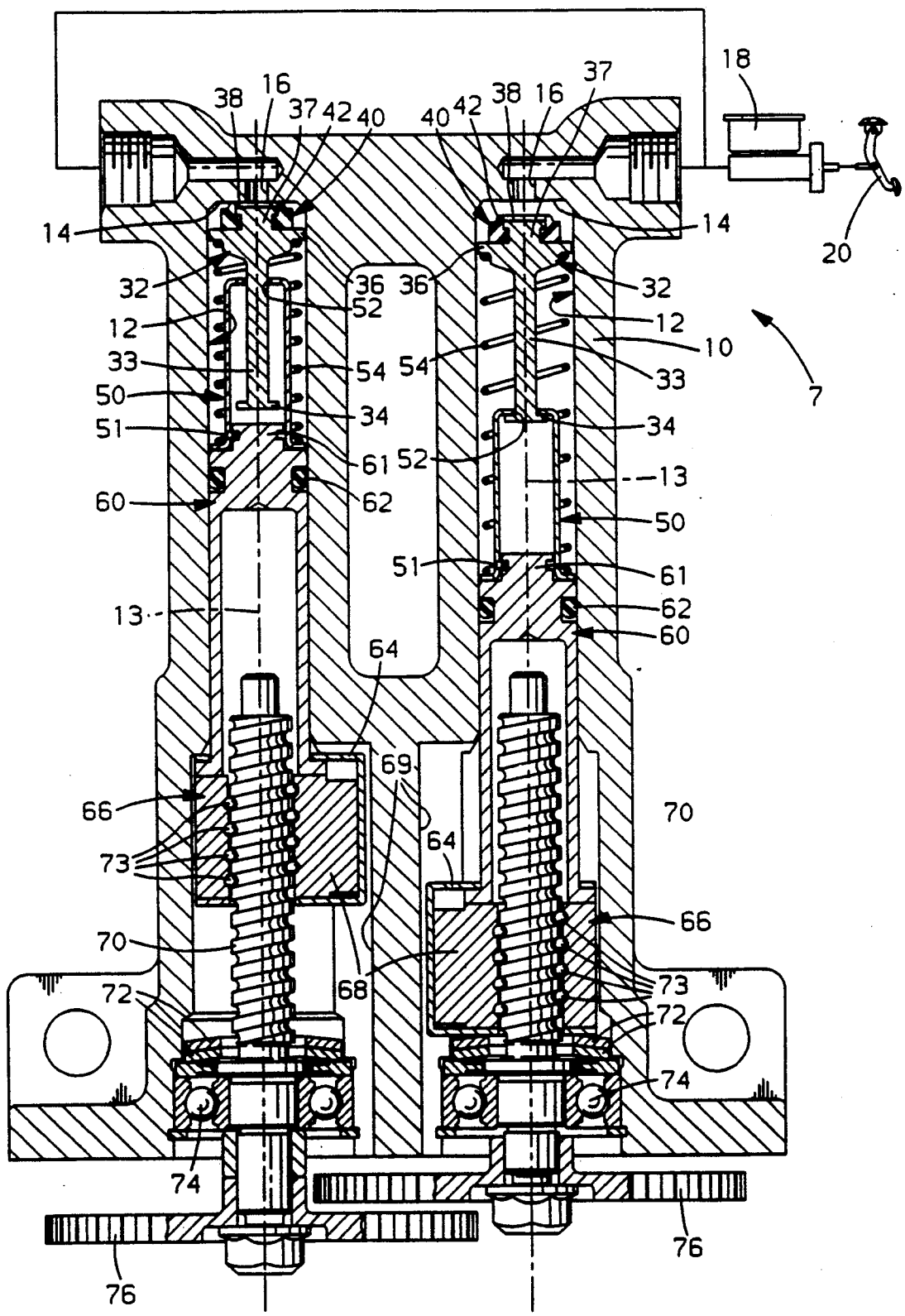
FIG. 2 is a view taken along line 2—2 of FIG. 1.

Referring to FIGS. 1 and 2, the traction control system 7 of the present invention has an actuator frame 10 with a longitudinal bore 12. Adjacent a top or first end 14 of the longitudinal bore there is an intersecting inlet 16 which provides the means of fluid communication with a pressurized fluid supplying master cylinder 18. Master cylinder 18 is actuated by a brake pedal 20.

The bore 12 has axially spaced from the inlet 16 an intersecting outlet 21 which connects the actuator frame 10 with a wheel brake (commonly referred to as a wheel brake cylinder) 24. The wheel brake 24 is used to restrain rotation of a wheel 22 and there is a sensor 26 which is cognizant of the rotative condition of the vehicle wheel 22. The wheel 22 will be one of a plurality of powered wheels on a common differential (not shown). The rotative condition of the wheel is signaled to a traction controller 28 which in turn is connected with a reversible electric actuator motor 30.

Slidably mounted within the bore 12 is a plunger 32. The plunger 32 has a shoulder 36 which provides general alignment and also provides a surface for mounting engagement with a light coil biasing spring 54. The spring 54 biases the plunger in a first direction towards the master cylinder inlet 16 to isolate the same from the remainder of the bore 12. On top of the shoulder 36 there is an elastomeric sealing head 40 having a top rim 42. The plunger 32 also has a neck member 37 along with a rigid (typically metallic) sealing head 38 encircled by the elastomeric sealing head 40.

To additionally aid the mounting of the spring 54 there is provided a spring retainer 50. The spring retainer 50 has a series of slots or holes (not shown) to allow easy bleedability to its interior. The retainer 50 also has an apertured end 52 allowing insertion of a stem 33 of the plunger 32. The aperture 52 has a modified T design (not shown) allowing for a nail head 34 of the plunger 32 to be inserted therein at an angle and thereupon in an upright position retaining the nail head 34 within the retainer 50, thereby limiting displacement of the plunger 32 away from the retainer 50.

The retainer 50 is crimped at 51 to a head section 61 of a piston 60. The piston 60 is slidably mounted within the bore and is sealed therein by an O-ring 62. Movement of the piston 60 along the linear axis 13 of the bore 12 is achieved by rotation of a drive screw 70 which is threadably engaged with a non-rotative nut 66. The nut 66 is fixably connected to the piston 60 by a clip 64. To cushion the travel of the piston 60 when the traction control system 7 is signaled in release cycle, there are a plurality of belleville washers 72. As mentioned previously, threadably inserted within the non-rotative nut 66 is a drive or ball screw 70 which is mounted within the actuator frame 10 by a set of bearings 74. The drive screw 70 is torsionally associated with the motor 30 by gears 76 and 78. To prevent rotation of the nut there is a slot 69 shown in FIG. 2 which mounts an extended portion 68 of the nut. Typically, the extended portion 68 will be the ball re turn portion for a ball screw bearing ball 73.

In the non-actuated side of traction control system 7, as shown in FIG. 2, the nut 66 is in a retracted position causing the retainer 50 to positively pull back the plunger 32. The elastomeric sealing head 40 will be withdrawn from the top of the bore 14 therefore fluid may freely flow from the master cylinder 18 to the wheel brake 24 as desired by the vehicle operator.

Upon detection of the appropriate rotative conditions by the sensor 26, the controller 28 will signal the motor 30 to rotate the ball screw in a manner as represented on the left hand side of FIG. 2 and FIG. 1 placing the nut 66 in an actuated or extended position therefore causing the piston 60 to move upward within the bore 12. Upon the initial upward movement of the piston 60 as shown in FIG. 2, the tip 42 of the elastomeric sealing head will mate with the top end 14 via the force exerted by the spring 54.

It is desirable to keep the spring 54 as light as possible with a wide diameter to minimize cyclic forces which may cause fatigue and also to have a low spring constant to minimize the force against the upward movement of the piston 60. The plunger 32 initially seals by the force of the spring 54. However, further upward movement of the plunger resultant of the increase of pressure within the bore 12 exposed to the vehicle brake 24 will cause the rigid typically metallic sealing head 38 to mate with the top of the bore 14. The above noted feature is important because it protects the elastomeric sealing head 40 from being damaged by the high pressures within the bore 12 which can reach up to 2,000 psi during the initial pressure increase cycle of the traction control modulation. The plunger 32 will remain in its position after being pressurized during the increase of pressure during the modulation phase wherein the drive screw 70 is reversed to lower the pressure and then reapply as signaled by the controller 28. The vehicle operator may override the system by simply placing his foot on the brake pedal 20 to an extent to overcome the pressure within the wheel brake 24 thereby causing the plunger 32 to be lowered and therefore reconnecting the master cylinder 18 with the wheel brake 24. As mentioned previously, retraction of the piston 60 is no longer solely dependent upon the pressure within the bore 12 or the force of a return spring since it is positively pulled down by the actuator nut 66 by virtue or rotation of the drive screw 70. Therefore, the relief cycle occurs a shorter time frame.

While an embodiment of the present invention has been explained, it would be readily apparent to those skilled in the art of the various modifications which can be made to the present invention without departing from the spirit and scope of the present invention as it is encompassed by the following claims.

The embodiments of the invention in which an exclusive property or privilege is claimed are defined as follows:

1. A vehicle wheel traction control system for an automotive vehicle which includes a master cylinder for supplying pressurized fluid to a fluid actuated wheel brake, and a controller cognizant to a rotative condition of a vehicle wheel, the system in combination comprising:

a frame with a longitudinal bore with an axis with means of fluid communication with the master cylinder intersecting the bore adjacent a first end of the bore and means of fluid communication with the wheel brake intersecting the bore spaced from the means of fluid communications with the master cylinder;

a plunger slidably mounted within the bore with a sealing head for fluidify isolating the bore from the means of fluid communication with the master cylinder by axial movement of the plunger in a first direction toward the bore first end;

spring means biasing the plunger in the first direction;

a piston sealably slidably mounted within the bore for creating a variable control volume in the bore and fluid communication with the wheel brake, the piston being separated from the plunger by the spring means;

means for mounting the spring means between the plunger and the piston;

relative translational displacement limiting means to limit the relative displacement of the plunger away from the piston in the first direction;

nut means with a threaded bore fixably connected with the piston on a side of the piston opposite the means of fluid communication with the master cylinder;

means preventing rotation of the nut means;

a drive screw threadably engaged with the nut means mounted for rotation for translating the nut means the piston;

reversible motor means responsive to signals given by the controller and torsionally associated with the drive screw whereby a movement of the piston in the first direction isolates the bore from the master cylinder and further movement of the piston allows the traction control system to modulate the pressure within the wheel brake.

2. A traction control system as described in claim 1 wherein a clip connects the piston with the nut means.

3. A traction control system as described in claim 1 wherein said spring means is a coil spring.

4. A traction control system as described in claim 1 wherein the sealing head has an elastomeric sealing portion which is compressed for sealing and further wherein there is a metallic rigid portion encircled by the elastomeric sealing portion which mates with the first end of the bore to limit the compression of the elastomeric sealing portion of the plunger.

5. A vehicle wheel traction control system for an automotive vehicle wheel which includes a master cylinder for supplying pressurized fluid to a fluid actuated wheel brake, and a controller cognizant of a rotative condition of the vehicle wheel, the system in combination comprising:
- a frame with a longitudinal bore with an axis with means of fluid communication with the master cylinder intersecting the bore adjacent a first end of the bore and means of fluid communication with the wheel brake axially spaced from the means of communication with the master cylinder;
- a plunger slidably mounted within the bore having a rigid portion with a surrounding elastomeric sealing portion isolating the bore from the means of fluid communication with the master cylinder by axial movement in a first direction, the rigid portion limiting the travel of the plunger in the first direction to limit the compression of the sealing portion, and the plunger having a shoulder and a nail head on an end of the plunger opposite the elastomeric sealing portion;
- a coil spring biasing the plunger in the first direction mating with the shoulder of the plunger;
- a spring retainer for mounting the coil spring, the spring retainer being cylindrical in shape with an end capturing the nail head of the plunger for limiting displacement of the plunger in a first direction away from the retainer;
- a piston connected with the spring retainer being slidably and sealably mounted within the bore for creating a variable control volume in the bore in fluid communication with the wheel brake;
- a nut connected with the piston by a clip, the nut having a threaded bore and means to prevent rotation of the nut within the bore of the frame;
- a drive screw threadably engaged with the nut whereby rotation of the drive screw axially translates the nut and the piston;
- an electric motor torsionally associated with the drive screw responsive to signals given by the controller to move the piston in the first direction causing said plunger to seal off the master cylinder from the bore and thereafter to modulate the pressure within said wheel brake.

* * * * *